United States Patent
Bartolotta et al.

(10) Patent No.: US 11,403,089 B2
(45) Date of Patent: Aug. 2, 2022

(54) VERSION MANAGEMENT AUTOMATION AND CONSISTENT APPLICATION BUILDS FOR DIFFERENT TARGET SYSTEMS

(71) Applicant: salesforce.com, inc., San Francisco, CA (US)

(72) Inventors: Jeffrey Michael Bartolotta, Concord, CA (US); James B. Wunderlich, Burlingame, CA (US); Dileep Burki, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/847,519

(22) Filed: Apr. 13, 2020

(65) Prior Publication Data
US 2020/0241870 A1     Jul. 30, 2020

Related U.S. Application Data

(62) Division of application No. 15/885,703, filed on Jan. 31, 2018, now Pat. No. 10,620,935.

(51) Int. Cl.
*G06F 8/71* (2018.01)
*G06F 8/41* (2018.01)
*G06F 8/65* (2018.01)

(52) U.S. Cl.
CPC .......... *G06F 8/65* (2013.01); *G06F 8/41* (2013.01); *G06F 8/71* (2013.01)

(58) Field of Classification Search
CPC ............. G06F 8/41; G06F 8/65; G06F 8/71
See application file for complete search history.

(56) References Cited

U.S. PATENT DOCUMENTS

| | | |
|---|---|---|
| 5,325,533 A | 6/1994 | McInerney et al. |
| 5,499,357 A | 3/1996 | Sonty et al. |
| 5,805,899 A | 9/1998 | Evans et al. |

(Continued)

OTHER PUBLICATIONS

R.S. Thompson et al., "APEX: Use of JAVA and XML in Automated Procedure Execution," [Online], 2004, pp. 1-10, [Retrieved from Internet on Nov. 25, 2019], <https://arc.aiaa.Org/doi/pdf/10.2514/6.2004-404-232>.

(Continued)

*Primary Examiner* — Ziaul A Chowdhury
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to database techniques for storing metadata for web applications. In some embodiments, a server computer system may operate a platform for executing one or more application modules that utilize one or more application components to implement an application. The server computer system may generate a first set of values indicative of versions of a first set of application modules specified by an application package stored on the server computer system for implementing the application. The server computer system may determine a second set of values indicative of versions of a second set of application modules specified by an updated application package for an upgrade of the application. The server computer system disables application components associated with application modules specified in the first, but not the second, set of values.

20 Claims, 8 Drawing Sheets

(56) References Cited

U.S. PATENT DOCUMENTS

| | | | |
|---|---|---|---|
| 7,596,777 B2 | 9/2009 | Fallen-Bailey et al. | |
| 8,245,219 B2 | 8/2012 | Agarwal et al. | |
| 8,285,876 B2 | 10/2012 | Chua | |
| 8,510,729 B2 | 8/2013 | Weissman et al. | |
| 8,578,363 B2 | 11/2013 | Sah et al. | |
| 8,589,897 B2 | 11/2013 | Myles et al. | |
| 8,701,103 B1 | 4/2014 | Hsu et al. | |
| 8,887,149 B2 | 11/2014 | Rogers et al. | |
| 8,924,950 B2 | 12/2014 | McDonald et al. | |
| 2002/0066075 A1 | 5/2002 | Mowers et al. | |
| 2002/0100036 A1 | 7/2002 | Moshir et al. | |
| 2004/0019799 A1 | 1/2004 | Vering et al. | |
| 2004/0098384 A1* | 5/2004 | Min | G06F 16/835 |
| 2005/0097301 A1 | 5/2005 | Ben-David et al. | |
| 2006/0026568 A1 | 2/2006 | Wiltamuth et al. | |
| 2006/0089932 A1 | 4/2006 | Buehler et al. | |
| 2007/0113187 A1 | 5/2007 | McMullen et al. | |
| 2008/0086482 A1 | 4/2008 | Weissman | |
| 2008/0162604 A1* | 7/2008 | Soulet | G06F 8/61 |
| 2008/0189693 A1 | 8/2008 | Pathak | |
| 2009/0006402 A1 | 1/2009 | Bohle et al. | |
| 2009/0119304 A1 | 5/2009 | Preslan et al. | |
| 2009/0150414 A1 | 6/2009 | Mcclanahan et al. | |
| 2010/0023519 A1 | 1/2010 | Kailash et al. | |
| 2010/0058197 A1 | 3/2010 | Chee et al. | |
| 2010/0095373 A1 | 4/2010 | Levenshteyn et al. | |
| 2010/0169876 A1 | 7/2010 | Mann | |
| 2010/0299663 A1 | 11/2010 | Weissman et al. | |
| 2013/0232246 A1* | 9/2013 | Miller | G06F 8/71 709/222 |
| 2013/0263083 A1* | 10/2013 | Reddy | G06F 8/41 717/106 |
| 2014/0122679 A1 | 5/2014 | Griffin | |
| 2014/0173579 A1 | 6/2014 | McDonald et al. | |
| 2014/0358868 A1 | 12/2014 | Costecalde et al. | |
| 2015/0169386 A1 | 6/2015 | Gopalraj et al. | |
| 2016/0092343 A1* | 3/2016 | Chhatwal | G06F 11/368 717/124 |
| 2016/0266896 A1 | 9/2016 | Fan et al. | |
| 2016/0335079 A1 | 11/2016 | Tammam et al. | |
| 2016/0352746 A1 | 12/2016 | Anderson et al. | |
| 2017/0123790 A1 | 5/2017 | Gupta et al. | |
| 2017/0147324 A1* | 5/2017 | Weber | G06F 8/60 |
| 2018/0260193 A1 | 9/2018 | Polisky et al. | |
| 2019/0005722 A1 | 1/2019 | Murching et al. | |

OTHER PUBLICATIONS

Liam Fallon et al., "Apex: An Engine for Dynamic Adaptive Policy Execution," [Online], 2016, pp. 699-702, [Retrieved from Internet on Nov. 25, 2019], <https://ieeexplore.ieee.org/stamp/stamp.jsp?arnumber=7502880>.

Andreas Hueni et al., "Structure, Components, and Interfaces of the Airborne Prism Experiment (APEX) Processing and Archiving Facility," [Online], 2009, pp. 29-43, [Retrieved from Internet on Nov. 25, 2019], <https://ieeexplore.ieee.org/stamp/stamp.jsp?arnumber=4694063>.

Saeed Iqbal et al., "Extending Java Pathfinder (JPF) with Property Classes for Verification of Android Permission Extension Framework," [Online], 2013, pp. 15-20, [Retrieved from Internet on Nov. 25, 2019], <https://ieeexplore.ieee.org/stamp/stamp.jsp?arnumber=6650135>.

* cited by examiner

| Version set 301 | | | |
|---|---|---|---|
| package | module | version | components used |
| 202a | 203 | A | 210, 211, 214 |
| 202a | 204 | C | 212, 215 |
| 202a | 205 | A | 212, 213, 215 |
| 202a | 206 | B | 212, 213, 216 |

| Version set 302 | | | |
|---|---|---|---|
| package | module | version | components used |
| 202b | 203 | A | 210, 211, 214 |
| 202b | 204 | C | 212, 215 |
| 202b | 205 | B | 212, 215 |

| Change log 303 | | | |
|---|---|---|---|
| module | installed version | upgrade version | orphaned components |
| 205 | A | B | 213 |
| 206 | B | removed | 213, 216 |

*FIG. 3*

VERSION MANAGEMENT AUTOMATION AND CONSISTENT APPLICATION BUILDS FOR DIFFERENT TARGET SYSTEMS

PRIORITY INFORMATION

The present application is a divisional of U.S. application Ser. No. 15/885,703, filed Jan. 31, 2018 (now U.S. Pat. No. 10,620,935), the disclosure of which is incorporated by reference herein in its entirety.

BACKGROUND

Technical Field

Embodiments described herein are related to the field of web-based computing systems, and more particularly to the implementation of application upgrades and version management.

Description of the Related Art

Cloud application development platforms, such as the Force.com multitenant architecture, may allow individual enterprises and software as a service (SaaS) vendors to develop robust, reliable, and Internet-scale applications. Web applications may access various types of data, e.g., by accessing a database and processing accessed information. Some applications may be targeted for different architectures or platforms. Providing consistent operation of such applications across various platforms may be desirable to achieve customer satisfaction. Similarly, a customer's satisfaction may be maintained or increased by providing a smooth upgrade experience from a currently installed version of an application to an upgraded version.

BRIEF DESCRIPTION OF THE DRAWINGS

FIG. 3 illustrates three tables used in an embodiment of a version management process.

Figure 1:
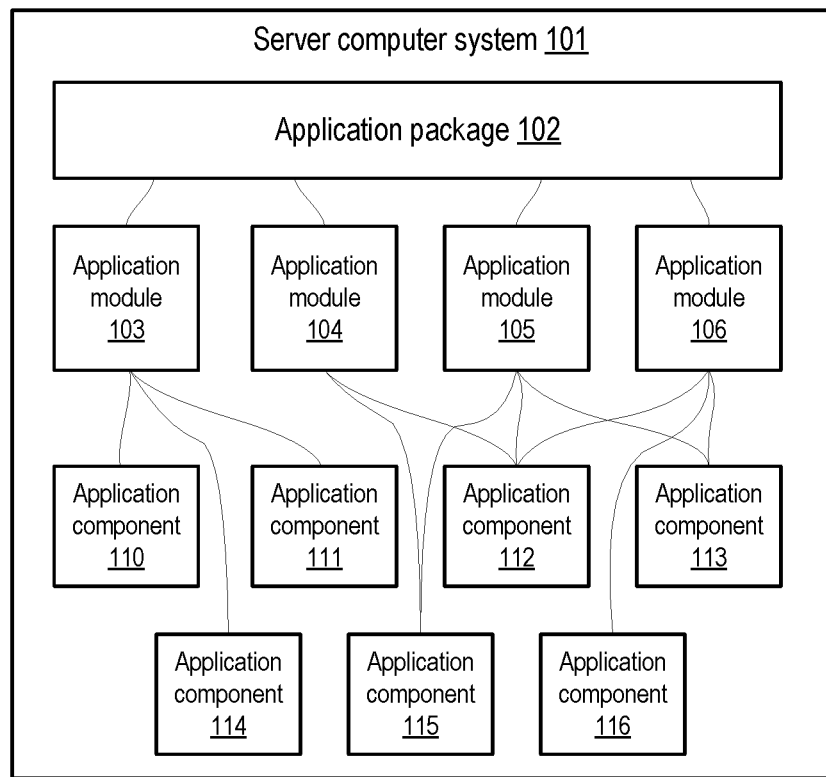
FIG. 1 shows a block diagram of an embodiment of an application package installed on a computer system.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processing element configured to store manageable state information" is intended to cover, for example, an element that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Computer applications, whether web-based, cloud computing, or locally installed, may be upgraded one or more times to newer versions. Such upgrades may, for example, add features, improve performance, or fix bugs in the newer version. A user's experience while installing an upgrade to a previously installed application may impact the user's decision to purchase or subscribe to future products from the application's developer. The developer, as well as the development platform, may determine how smoothly an upgrade process may be implemented. A smooth upgrade experience may require little to no effort on behalf of the user to install the upgrade package and continue use of the application. In contrast, a poor upgrade experience may include requiring the user to know version information for currently installed applications, result in lost features or obfuscate access to previously available features, or otherwise disrupt the workflow of the user in an unacceptable manner. In various embodiments described herein, disclosed techniques may enable an application developer to develop a smooth upgrade process for web applications and application packages.

A block diagram of a computer system is shown in FIG. 1. Application package 102 is installed on server computer system 101 in the illustrated embodiment. Application package 102 includes four modules, application modules 103-106. The four modules utilize components 110-116.

Server computer system 101 may correspond to any suitable type of computer system onto which applications may be installed. In the illustrated embodiment, server computer system 101 corresponds to an Internet connected system of one or more server computers capable of hosting cloud-based application development and execution platforms, such as, for example, the Force.com multitenant architecture. A subscriber to services hosted by server computer system 101 may install and execute application package 102. In some embodiments, installation of application package 102 may include storage of program instructions, data, and metadata related to application package 102 onto a computer system local to the subscriber. In the illustrated embodiment, the installation process may include storage of program instructions, data, and metadata related to application package 102 into a program space allocated to the subscriber and maintained as a part of server computer system 101.

Application package 102, in the illustrated embodiment, corresponds to one or more files that include program instructions, data, or metadata associated with one or more applications. As used herein, an "application package," or simply a "package" is a metadata object that references a set of metadata objects used in an application. A "package" may include a collection of metadata components. A package can also include computer code (e.g., Apex, JavaScript, etc. or formulas) and files (e.g., Word documents or other file types). In some embodiments, a developer can precisely define a metadata "package" which includes all setup data (e.g., custom object definitions, page layout definitions, workflow rules, etc.) that make up an application.

An application package may specify one or more application modules. As shown, application package 102 specifies application modules 103-106. Application modules 103-106 may correspond to applications or respective portions of an application included in application package 102. In one embodiment, for example, application module 103 may include computer instructions that implement a user interface, while application module 104 includes computer instructions for retrieving and storing data. Furthermore, application module 105 may include computer instructions for manipulating retrieved data, and application module 106 may include computer instructions for performing various searching algorithms on data. By subdividing an application into such a modular structure, a developer may be able to maintain and revise each application module 103-106 independently. Application modules 103-106 utilize application components 110-116. In the illustrated embodiment, application components 110-116 correspond to information used by application modules 103-106 to perform their respective tasks, and may include files, data, templates, metadata, and the like. For example, application module 104 may utilize application component 115 to format a display of data read from server computer system 101. Some components 110-116, as illustrated in FIG. 1, may be utilized by more than one application module 103-106. In some embodiments, one or more of application components 110-116 may be generated by a subscriber of application package 102 rather than an application developer. For example, the subscriber may modify a default user interface, creating a different look and/or including different functions or user options.

Installation of application package 102 onto server computer system 101, in the illustrated embodiment, includes storing computer instructions and data into a memory workspace assigned to a subscriber that initiates the installation. In some embodiments, all program code and data included in application modules 103-106 and application components 110-116 is stored in the workspace, providing the subscriber with a copy of files and instructions that implement the one or more applications included in application package 102. In other embodiments, some or all of application modules 103-106 and application components 110-116 may be kept in a shared memory location where they can be accessed by other users, and then data and program code that may be modified by the subscriber are stored in the memory workspace of the subscriber. In such an embodiment, application package 102 may specify which application modules 103-106 and/or application components 110-116 are to be retrieved from the shared memory, versus the subscriber's workspace, when an application from application package 102 is executed.

The developer may release an upgraded version of application package 102 after revising one or more of application modules 103-106 and/or application components 110-116. In some embodiments, the developer may add application modules and/or components to application package 102. After an upgrade to application package 102 is made available for installation, each subscriber with an installed version of application package 102 may independently choose to install the upgrade or not. Over time and multiple released upgrade packages, each subscriber with an installed version of application package 102 may have a different combination of versions of application modules 103-106 and components 110-116 based on their particular upgrade choices. Developers may, therefore, utilize particular techniques to help subscribers upgrade to newer versions of application package 102. Disclosed in detail below, is an application upgrade technique in which server computer system 101 generates a first set of values indicative of respective versions for application modules 103-106 included in a currently installed application package. Server computer system 101 may also determine a second set of values indicative of respective versions for application modules included in an upgrade for application package 102. Server computer system 101 may compare the first and second sets of values, and then, based on the comparison, disable or deactivate components 110-116 that are not included in the upgrade package.

It is noted that the system of FIG. 1 is merely one example. In other embodiments, the computer system may include additional application packages. In some embodiments, a different number of application modules and/or components may be associated with each application package.

Figure 2:
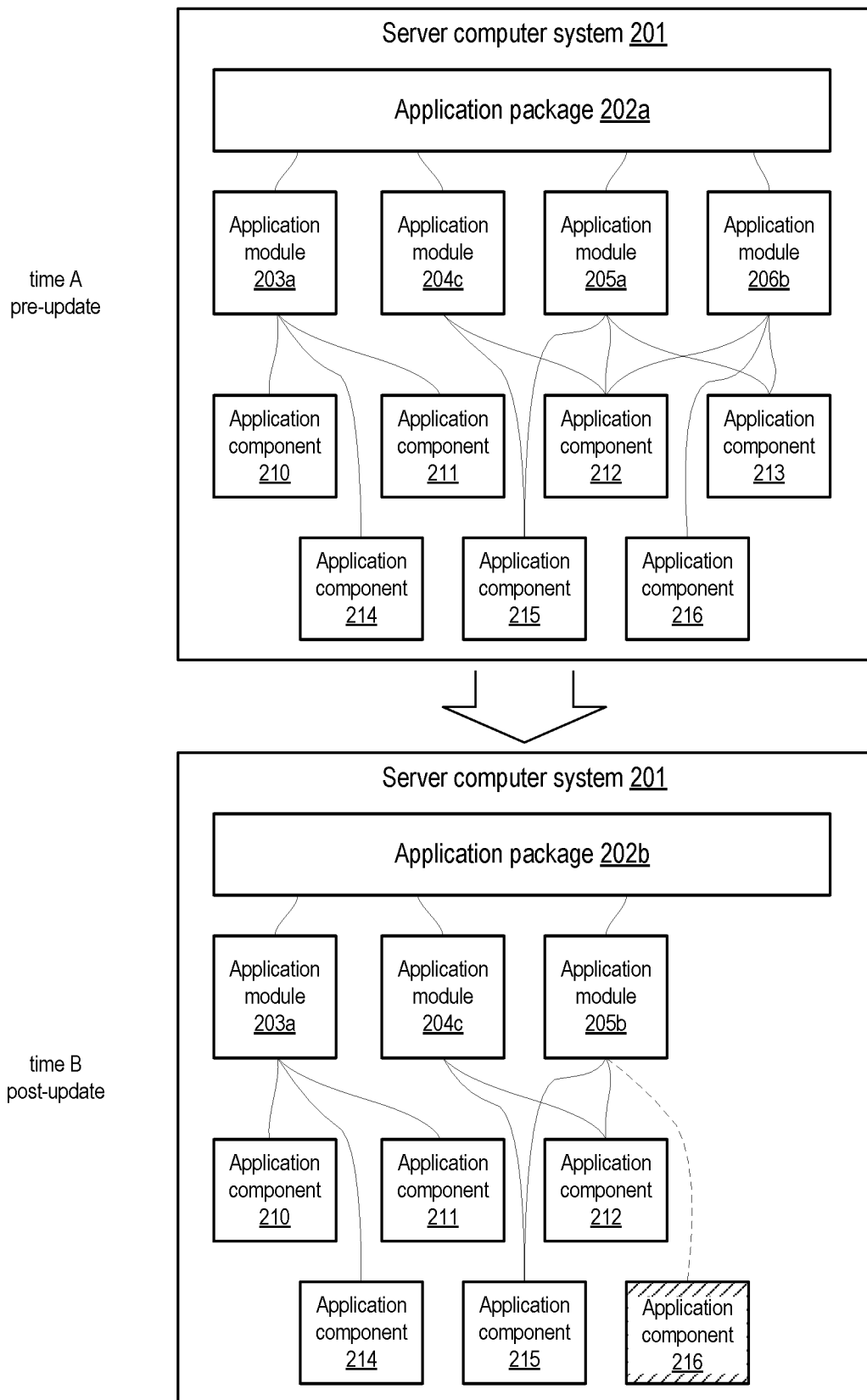
FIG. 2 depicts a block diagram of an embodiment of an application package and an upgrade to the application package.

Moving to FIG. 2, a computer system with an installed application package is depicted at two points in time. Server computer system 201 is shown at time A before an upgrade to application package 202a is installed. Server computer system 201 is further illustrated at time B after an upgrade to application package 202b has been installed. Server computer system 201 and application packages 202a and 202b may correspond to the descriptions disclosed above in regards to the similarly named and numbered components FIG. 1 except as noted below.

Application package 202a, in the illustrated embodiment, corresponds to a current version of an application package installed on server computer system 201. Application package 202a includes application modules 203a, 204c, 205a, and 206b, as well as components 210-216. Application package 202b is an upgrade package for application package 202a, and includes application modules 203a and 204c, which are a same version as included in package 202a. Package 202b also includes application module 205b which may replace application module 205a in the upgraded package. Application module 206b is excluded from application package 202b. In various embodiments, functionality enabled by application module 206b may be obsolete in package 202b or may be incorporated into another application module, such as, for example, application module 205b.

As shown at time B, a subscriber has upgraded application package 202 from version 202a to version 202b. During the installation of package 202b, application module 206b is removed and application module 205a is replaced with application module 205b. Before any application modules are removed or replaced, server computer system 201 generates a first set of values indicative of a version for each of the application modules specified by the installed application package 202a. Server computer system 201 then determines a second set of values indicative of a version for each of the application modules specified by the upgrade application package 202b. After application module 206b has been removed and application module 205b has been installed, server computer system 201 compares the first and second sets of values to generate a change log which, in the current example, indicates that application module 205a is replaced with 205b, and application module 206b is removed. Based on this comparison, server computer system 201 disables or deactivates application components 213 and 216 that are associated with application modules 205a and 206a that are not included in package 202b. Server computer system 201 may also, in some embodiments, update or generate a metadata object to store version information for application modules and components associated with application package 202b. This metadata object may also be included as part of application package 202b.

A component in an upgraded application package that is no longer utilized by any of the current application modules is referred to herein as an "orphaned" component. These orphaned components may be disabled or deactivated in various ways, depending, for example, on a type of information included in the "orphaned" components. For example, orphaned components that include programmatic information may be removed, while orphaned components that include schema information may be deprecated. As used herein, "programmatic" refers to information associated with the execution of program instructions, while "schema" refers to information related to a plan or scheme for operation of an application. For example, an application component that includes data for formatting a display of a result of a particular application module may be programmatic and therefore unnecessary if the particular application module is removed from a package upgrade. In contrast, an application component that includes data collected by a subscriber and is formatted and presented by the particular application module may be schema and therefore deprecated, rather than removed, if the particular application module is removed from the package. In some embodiments, deprecated schema components may be highlighted after a package upgrade, such that the subscriber may review deprecated components and determine if they may be removed or retained in the subscriber's workspace.

In the illustrated embodiment, application component 213 is associated with application modules 205a and 206b of package 202a. In package 202b, however, component 213 is not associated with application module 205b, or the other application modules, and is therefore removed. Application component 213 includes programmatic data or metadata, such as, e.g., data generated by the developer of application package 202a or generated by application modules 205a or 206b, and therefore, may not be used by application module 205b. Application component 216 is associated only with application module 206b in package 202a, and is not associated with any application module in package 202b. Application component 216, however, contains schema data or metadata, such as, for example, user generated data (e.g., a particular data table, or table format, a particular user interface, or similar data or metadata). Rather than remove this user generated data, application component 216 is deprecated. For example, an indication that application component 216 is not utilized by the upgraded application package 202b may be added to metadata associated with application component 216. A dotted line is illustrated to show that data in application component 216 may be accessible through application module 205b. In other embodiments, application component 216 may not be accessible using application package 202b, but instead be accessible through another application.

It is noted that the embodiment of FIG. 2 is an example for demonstrating the disclosed concepts. In other embodiments, a server computer system may include any number of application packages, which, in turn, may include any suitable number of application modules and application components. Although not shown in FIG. 2, a package upgrade may increase a number of application modules and/or application components.

Turning now to FIG. 3, several tables that may correspond to an application package upgrade technique are illustrated. In the illustrated embodiment, these three tables correspond to the package upgrade shown in FIG. 2, from application package 202a to 202b. Version set 301 corresponds to the first set of values indicative of the version for each of the application modules specified by the installed application package 202a. Version set 302, similarly, corresponds to the second set of values indicative of the version for each of the application modules specified by the installed application package 202b. As shown, each of version sets 301 and 302 includes four columns: one for a package identifier, one for a list of application modules included in the identified package, one for a revision indication of the respective application module, and one to identify application components used by the respective application module. The third table corresponds to change log 303 that includes entries for differences between version set 301 and version set 302. Change log 303 also includes four columns: one to identify an application module with a version change, one to indicate the installed (i.e. application package 202a) version of the module, one to indicate the upgrade (i.e. application package 202b) version of the module, and one to identify orphaned components that may be disabled.

Referring back to FIG. 2, server computer system 201 may generate the module list in version set 301 in any suitable manner. For example, server computer system 201 may search for application module references within a metadata object associated with application package 202a, and/or within computer code in application package 202a. Similarly, application module version identifiers may be included in respective metadata associated with each application module, or may be included in a reference or comment embedded within computer code of the application module. In some embodiments, the version indicator may be included in the application package as part of the reference to the application module. Likewise, server computer system 201 may determine the components used by each included application module using similar methods. It is noted that version set 301 may not be generated until server computer system 201 receives an indication that application package 202a is to be upgraded. By waiting until an upgrade is detected, version set 301 may include the most recent version information without server computer system 201 maintaining an ongoing version log.

In some embodiments, server computer system 201 may generate version set 302 in a similar manner as version set 301. In the illustrated embodiment, server computer system 201 may retrieve information to generate version set 302 from package installation instructions, package release notes, or other documentation or metadata associated with application package 202b. For example, application package 202b may have an associated metadata object that identifies application modules, application components, and respective versions to be installed or linked to as part of an installation process. This metadata object may be used by an installation program executing on server computer system 201 when installing application package 202b in a subscriber's workspace.

After generating both version sets 301 and 302, server computer system 201 compares the two tables to determine differences between the installed package and the upcoming upgrade package. As shown, server computer system 201 generates change log 303, with entries that identify application modules that are being modified. The version for application module 205 is changed from "A" to "B" from version set 301 to 302, thereby causing an entry for module 205 with the respective version indicators included. In version set 301, the module 205 entry lists three used components (212, 213, and 215), while in version set 302, the module 205 entry list only two used components (212 and 215), thereby indicating that application component 213 is not used in application package 202b, and therefore, identified as an orphaned component. Version set 302 does not include a version for application module 206, while version set 301 indicates version "B" is used. An entry for module 206 is added to change log 303 with the installed package version identified and the upgrade package version indicated as "removed." Orphaned components associated with application module 206 and not used by other application modules in the upgrade package are identified as components 213 and 216.

Server computer system 201 may use change log 303 to install upgraded application module 205b and to disable the orphaned application components 213 and 216. In some embodiments, some or all of the three tables may be saved, for example, in the subscriber's workspace as part of a revision history for application package 202. In other embodiments, the data in the tables may be generated in volatile memory and discarded once the upgrade to application package 202b has completed. Change log 303, in some embodiments, may not be generated in a tabular format, and instead, server computer system 201 may perform the appropriate actions directly from comparisons of version sets 301 and 302.

It is noted that the tables of FIG. 3 are example embodiments. The illustrated tables provide one technique for identifying application module versions and comparing versions to an application package upgrade. In other embodiments, the tables may include more or less information. For example, in some embodiments, the components used column may be omitted.

Figure 4:
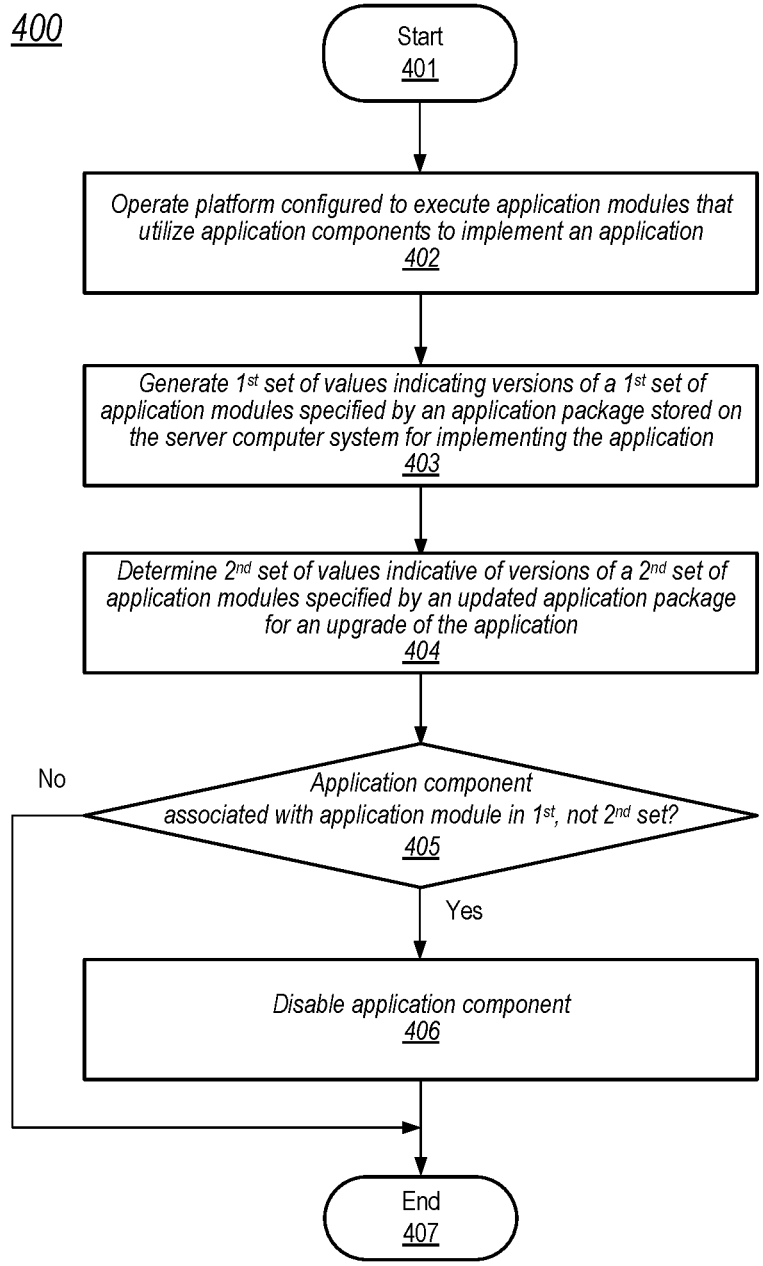
FIG. 4 shows a flow diagram of an embodiment of a method for managing version control.

Moving now to FIG. 4, a flow diagram illustrating an embodiment of a method for upgrading an application package such as described above. Method 400 may be implemented by a computer system, such as, for example, server computer systems 101 and 201 in FIGS. 1 and 2. Method 400, in the illustrated embodiment, may be performed to upgrade application package 202a, currently installed in a subscriber's workspace, to application package 202b. In some embodiments, method 400 may be performed multiple times on server computer system 201 to upgrade a different version of the application package 202, installed on a different subscriber's workspace, to application package 202b. Referring collectively to FIGS. 2 and 4, method 400 begins in block 401.

A server computer system operates a platform for executing one or more application modules that utilize one or more application components to implement an application (block 402). In various embodiments, server computer system 201 operates a platform for executing one or more applications that are part of an application package. In the illustrated embodiment, server computer system 201 corresponds to an Internet connected system of one or more server computers capable of hosting cloud-based application development and execution platforms, such as, for example, the Force.com multitenant architecture. As used herein, "platform" refers to computer code that, when executed on a computer system, provides an environment for executing applications. The applications may be performed by executing one or more application modules that include computer code, such as, e.g., application modules 203a, 204c, 205a, and 206b.

The server computer system generates a first set of values indicative of versions of a first set of application modules specified by an application package stored on the server computer system for implementing the application (block 403). In the illustrated embodiment, server computer system 201 generates a first set of values, each value indicating a respective version of application modules 203a, 204c, 205a, and 206b. In some embodiments, the first set of values may be included in a table such as version set 301 in FIG. 3. Server computer system 201, in the illustrated embodiment, generates the first set of values in response to installing an upgrade to application package 202a. As disclosed above, server computer system 201 may obtain the version indications from various sources, including, for example, from metadata objects associated each of the specified application modules.

The server computer system determines a second set of values indicative of versions of a second set of application modules specified by an updated application package for an upgrade of the application (block 404). Server computer system 201 generates, in the illustrated embodiment, a second set of values, each value indicating a respective version of a module specified by the upgrade, application package 202b, including application modules 203a, 204c, and 205b. In some embodiments, the second set of values may be included in a table such as version set 302 in FIG. 3. Server computer system 201, in some embodiments, may obtain the version indications for the second set of values from various sources, including, for example, from information related to the installation of application package 202b.

Further operations of method 400 may depend on an association between an application component and an application module (block 405). In the illustrated embodiment, server computer system 201 compares the first and second sets of values to identify application modules that are modified or removed when upgrading from application package 202a to application package 202b. Server computer system 201 may also identifies application components that are orphaned due to changes in the application modules resulting from the upgrade. For example, in one embodiment, server computer system 201 may generate change log 303, as shown in FIG. 3. For each application component utilized in application package 202*a*, a determination is made if the application component is orphaned. If the application component is orphaned, then the method moves to block 406 to disable it. Otherwise, the method ends in block 407.

Based on the comparison, the server computer system disables application components associated with application modules specified in the first, but not the second, set of values (block 406). The orphaned application components are not utilized in the upgraded application package 202*b*. Server computer system 201, therefore, disables these orphaned components. In various embodiments, orphaned components may be deleted from a workspace where application package 202*b* is installed, or may be deprecated (or otherwise marked by a particular data value to indicate it is no longer utilized). In some embodiments, orphaned components may be placed into two or more groups or sets. How an orphaned component is disabled, in such an embodiment, depends on which group the component is placed. The method ends in block 407.

It is noted that method 400 is merely an embodiment for demonstrating a disclosed technique. In other embodiments, a different number of operations may be included. In some embodiments, operations may be performed in a different order, and in some cases, in parallel.

Figure 5:
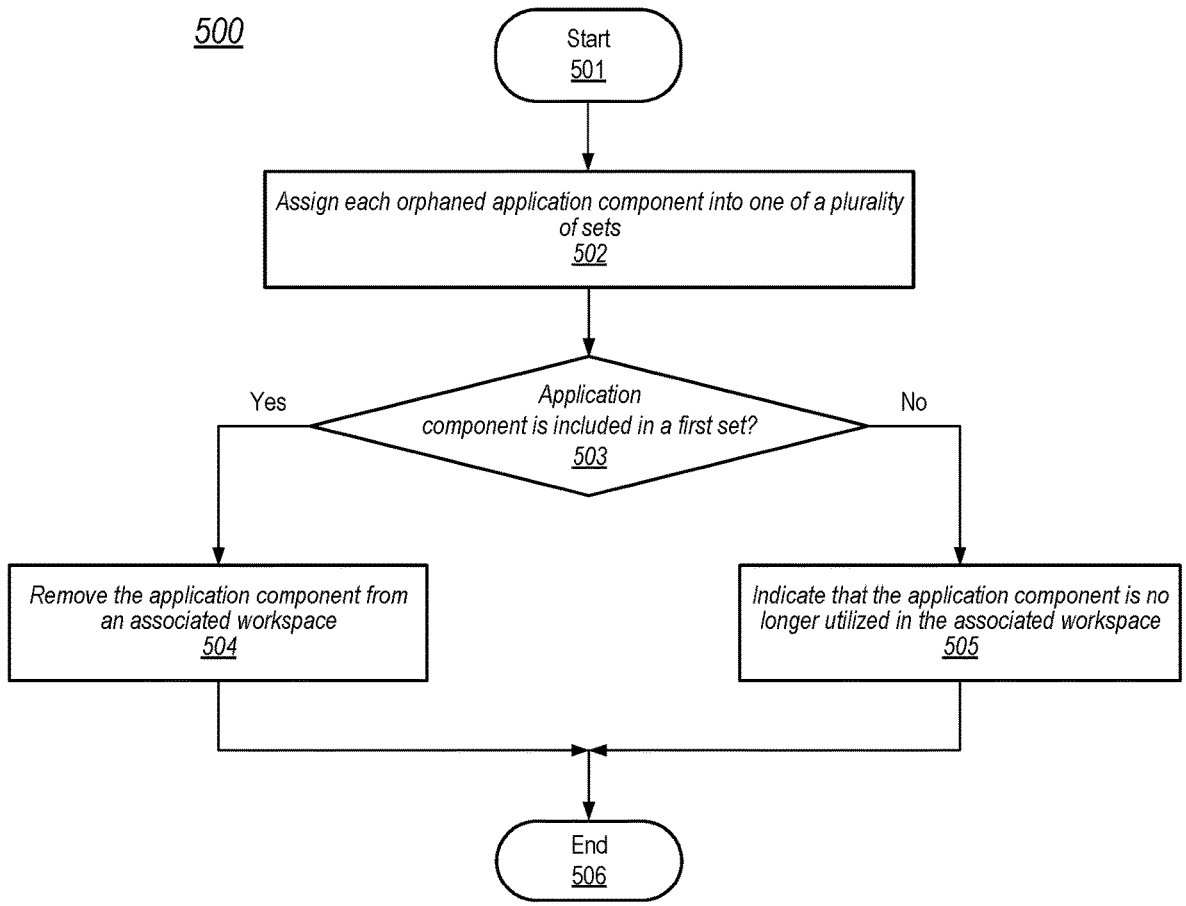
FIG. 5 depicts a flow diagram of an embodiment of a method for disabling application components.

As stated above, in some embodiments, orphaned components may be placed into two or more groups or sets. An embodiment of a method for disabling orphaned components is illustrated in FIG. 5. Method 500, like method 400 in FIG. 4, may be performed by a computer system, such as, for example, server computer systems 101 and 201 in FIGS. 1 and 2, respectively. The operations of method 500, in some embodiments, may correspond to operations included in block 406 of method 400. Method 500 begins in block 501 with orphaned components having been identified by server computer system 201.

A server computer system assigns each orphaned application component into one of a plurality of sets (block 502). Server computer system 201 assigns each identified orphaned component into one of a plurality of sets. For example, in the illustrated embodiment, the orphaned components may be assigned to one of two sets. The first set includes orphaned components that include programmatic information, while the second set includes orphaned components that include schema information.

Subsequent operations of method 500 may depend on which set of orphaned components an application component is placed (block 503). For each orphaned component, server computer system 201 determines to which of the plurality of sets the current orphaned component is assigned. If the current orphaned component is assigned to the first set, then the method moves to block 504 to remove the component. Otherwise, the method moves to block 505 to indicate the component is no longer utilized.

The server computer system removes the first set of the application components from an associated workspace (block 504). In the illustrated embodiment, orphaned components in the first set are removed from a workspace on server computer system 201 onto which the upgraded application package 202*b* is installed. These orphaned components may include programmatic information or information that was used for program control or flow. Such data may have been generated by a developer of application package 202*a* and may have no value to a user of application package 202*b*. The application components of the first set, therefore, may be removed from the user's workspace with little to no impact to the operation of application package 202*b*.

The server computer system indicates that the second set of the application components are no longer utilized in the associated workspace, without removing the second set of application components (block 505). Orphaned components included in the second set may include schema information as well as other information that may include data collected or prepared by the user. Although not utilized by the application modules specified by the newly installed application package 202*b*, the user may desire to modify one or more application components that are utilized by the specified application modules to include some or all of the information included in the second set of orphaned components. Server computer system 201, therefore, adds or sets a data value into the components of the second set to indicate that these orphaned components are not utilized in the user's current workspace. The information contained in the second set of orphaned components is, however, retained, and after the installation of application package 202*b* has completed, the user may review the indicated application components and determine if the information contained therein should be further retained, or otherwise removed. The method ends in block 506.

It is noted that method 500 of FIG. 5 is one example. In other embodiments, operations may be performed in a different order. In some embodiments, a different number of operations may be included.

The above discussions have presented various embodiments for installing an upgraded application package onto a computer system. Further discussions below feature embodiments for generating application packages that are built to run on different execution engines. As used herein, an "execution engine" refers to program code that, when executing on a computing system, enables applications written in a particular programming language to execute. Some examples of execution engines include Java, XML, and Apex engines. Multiple execution engines may be installed on a single computer system such that application packages installed on the computer system, or in one workspace of the computer system, may include computer code for any installed execution engine.

An application developer may generate an application package specifying one or more application modules that utilize computer code for a first execution engine that is included in a cloud-based platform hosted on a server computer system that supports a plurality of workspaces. One or more subscribers to the cloud-based platform may install the developer's application package. In some cases, a subscriber may modify portions of the application and/or install additional application packages that utilize features of the developer's application package. At some point in time, the developer may desire to migrate their application package to a second execution engine. For example, an entity that manages the server computer system may install the second execution engine within the cloud-based platform to enable new features, improve performance of applications, and/or reduce application development time for developers. In some embodiments, the first execution engine may correspond to a first execution environment, while the second execution engine corresponds to a second execution environment.

If the developer has multiple subscribers using their application, then migration of these customers to the new version of the application package may be problematic. A first subscriber who has significant development around the application package (e.g., modifications, additional application packages) may be reluctant to migrate to the new package in the second execution environment, while a second subscriber may not have additional development around their version of the application package and, therefore, be willing to migrate to the second execution environment sooner than the first subscriber. Such a scenario may result in the developer supporting two versions of source code for their application package until all subscribers can be migrated to the new version.

Various embodiments are presented below that may enable an application developer to support an application package for two or more execution engines without having to maintain two versions of source code. The disclosed embodiments, may also allow for the application package to provide similar functionality via use of any of the two or more execution engines.

Figure 6:
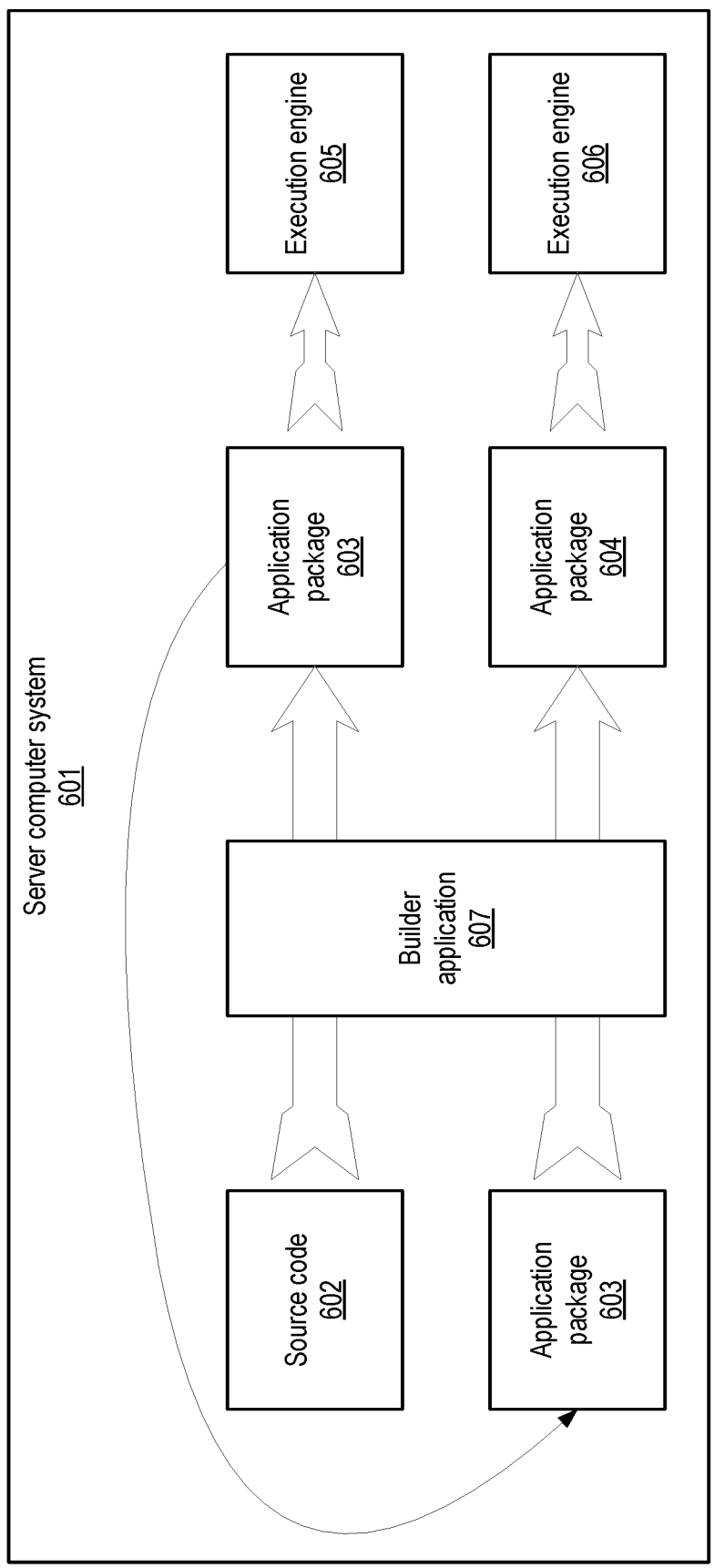
FIG. 6 illustrates a block diagram of an application package build for multiple execution engines.

An example of a server computer system with multiple execution engines is shown in FIG. 6. Server computer system 601 operates a platform for executing builder application 607 and execution engines 605 and 606. A developer of application packages may utilize builder application 607 to build application packages 603 and 604 from source code 602.

Server computer system 601 may correspond to any suitable type of computer system onto which multiple execution engines may be installed. In the illustrated embodiment, server computer system 601 corresponds to an Internet connected system of one or more server computers capable of hosting cloud-based application development and execution platforms, such as, for example, the Force.com multitenant architecture. An application developer may utilize server computer system 601 to develop, build, and execute application packages 603 and 604 using source code 602. In some embodiments, application packages 603 and 604 may include various application modules and application components, such as described above for application package 102.

Builder application 607, in the illustrated embodiment, includes computer code that when executed on server computer system 601, is capable of generating, from source code 602, application package 603 capable of running on execution engine 605. To build application package 603, and its associated application modules and components, builder application 607 may perform any suitable combination of operations on source code 602 including, but not limited to, one or more of: linking one or more files specified by source code 602, generating one or more metadata objects that control a workflow, identifying errors in program code, compiling error-checked code, assembling compiled code into machine language code, and the like. In various embodiments, source code 602 may include any suitable combination of text files that include one or more lines of program code, data, and/or metadata, as well as files that include pre-compiled program code in a binary format (e.g., compiled library functions). It is noted that, as used in reference to FIGS. 6 and 7, building an application package may include building some or all of application modules and components specified by the application package.

Builder application 607 is also capable of generating application package 604, using application 603 as source code, such that application package 604 is capable of running on execution engine 606. To generate application package 604, builder application 607 may perform, on application package 603, any combination of operations just described for building application package 603. In addition, builder application 607 may determine a particular programming language used in the building of application package 603 and translate program code written in this language to a different programming language as part of the build of application package 604. For example, during the build of application package 603, one or more application modules may be built that include XML code. As part of a build of application package 604, this XML code may be translated into a different programming language, such as, for example, Apex code.

After the respective builds, application package 603 may be executed on execution engine 605, while application package 604 may be executed on execution engine 606. In the illustrated embodiment, however, application package 603 may not be executed on execution engine 606, and vice versa. Since application package 604 is generated from application package 603, both packages may be capable of performing the same operations. In some embodiments, however, application package 603 may include a feature that is not supported by application package 604, or application package 604 may include a feature that is implemented differently from application package 603. In the illustrated embodiment, the functionality of each application package may be similar enough that a subscriber, or other user, migrating from application package 603 may be able to utilize application package 604 with little to no disruptions. The developer, therefore, may be able to migrate a selected subset of users of application package 603 to application package 604, while still supporting the unselected subset of users with application package 603. If a change is to be made to either package 603 or 604, the developer may make the change in source code 602 and then re-build both application packages 603 and 604 starting with the changed source code 602.

It is noted that FIG. 6 is merely one example. In other embodiments, the computer system may include additional execution engines. Although a single block is illustrated for source code 602, any number of files may be included.

Figure 7:
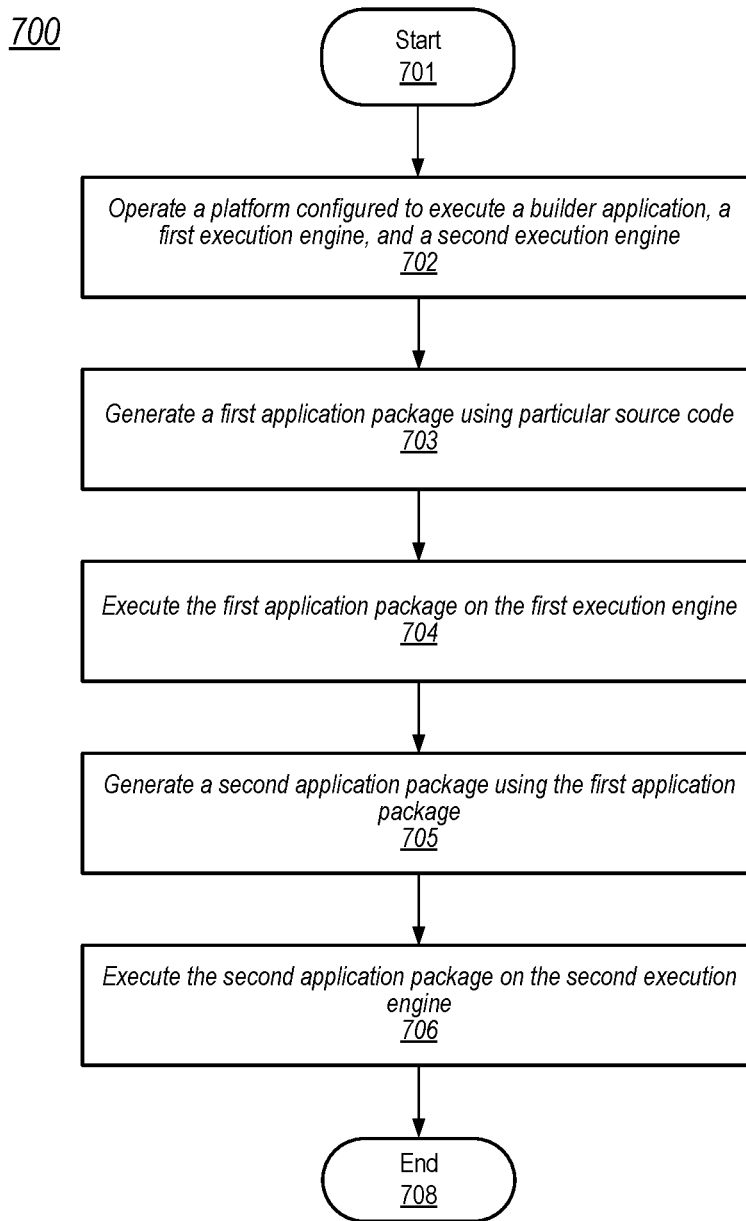
FIG. 7 depicts a flow diagram of an embodiment of a method for building an application package.

Moving to FIG. 7, a flow diagram for a method for building application packages for different execution engines is shown. Method 700 may be performed by a computer system, such as, for example, server computer system 601 in FIG. 6. It is noted that the operations of method 700 may be combined with the operations of methods 400 and 500, in FIGS. 4 and 5, respectively, to provide a method for building and installing an application package in a user's workspace. Referring collectively to FIG. 6 and the flow diagram of FIG. 7, the method begins in block 701.

A server computer system operates a platform for executing a builder application, a first execution engine, and a second, different execution engine (block 702). In the illustrated embodiment, server computer system 601 operates a cloud-based application development and execution platform, such as, e.g., the Force.com multitenant architecture, that enables execution of builder application 607, execution engine 605 and execution engine 606. In some embodiments, access to builder application 607 may be limited to an application development workspace, while execution engines 605 and 606 may be accessible from any suitable workspace supported on server computer system 601.

The builder application generates a first application package using source code accessible to the server computer system (block 703). An application developer builds application package 603 using builder application 607. As shown, builder application 607 receives source code 602 as input and generates application package 603, including building one or more application modules and/or components specified by application package 603. Some or all of application package 603 and its associated modules and components may include computer code written in a first programming language.

The server computer system executes the first application package on the platform using the first execution engine (block 704). After application package 603 has been built, the developer, or another user, may cause server computer system 601 to launch and execute application package 603 using execution engine 605. It is noted that execution engine 606 may not be capable of executing code included in application package 603 or its associated modules and components.

The builder application generates a second application package from the first application package (block 705). In the illustrated embodiment, the application developer builds application package 604 using builder application 607. Builder application 607 receives application package 604 as input for generating application package 603. Using application package 603 and one or more application modules or components specified by application package 603, builder application 607 generates application package 604, including building one or more application modules and/or components specified by application package 604. Some or all of application package 604 and its associated modules and components may include computer code written in a second programming language, different from the first programming language.

The server computer system executes the second application package on the platform using the second execution engine (block 706). Similar to application package 603, the developer or another user may cause server computer system 601 to launch and execute application package 604 using execution engine 606. It is noted that execution engine 605 may not be capable of executing code included in application package 604 or its associated modules and components.

It is noted that method 700 is one embodiment for demonstrating disclosed concepts. In other embodiments, a different number of operations may be included. In some embodiments, operations may be performed in a different order, and in some cases, in parallel.

A developer may build application packages 603 and 604 in order to migrate subscribers that are ready to migrate to applications that utilize execution engine 606, while also supporting customers that might face difficulty and/or expense to migrate to application utilizing execution engine 606. A particular fix or update may be made to both packages 603 and 604 by editing just source code 602, thereby eliminating a need for the developer to maintain and edit separate source code for each of the application packages.

Figure 8:
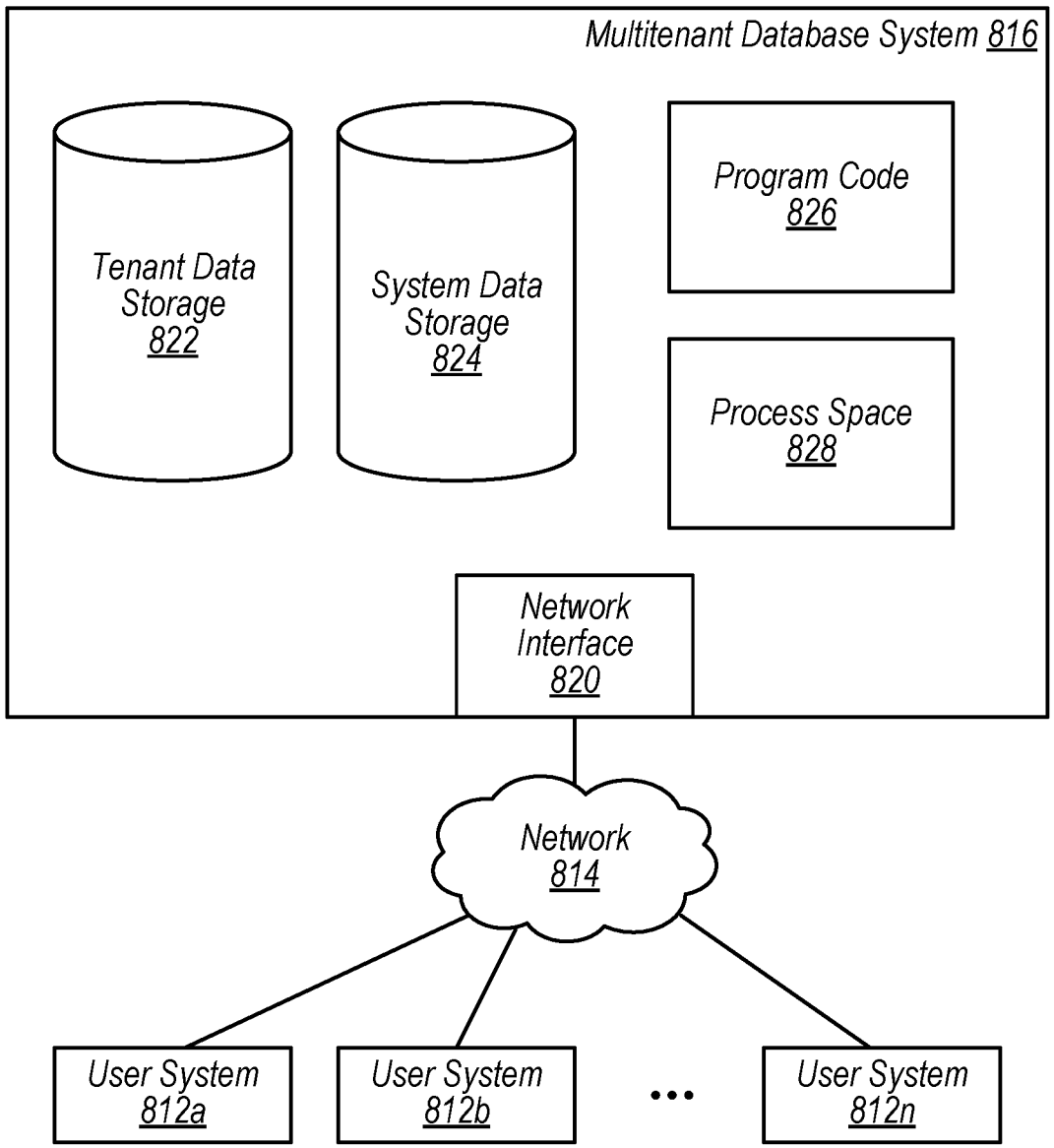
FIG. 8 shows a block diagram of an embodiment of a multitenant database system

An example of a possible embodiment of a server computer system, such as server computer systems 101, 201, and 601, is presented below in FIG. 8. FIG. 8 illustrates an exemplary environment in which a multitenant database system might be implemented. Note that the disclosed multitenant system is included for illustrative purposes, but is not intended to limit the scope of the present disclosure. In other embodiments, similar techniques may be implemented in non-multitenant environments such as various client/server environments, cloud computing environments, clustered computers, etc. As illustrated in FIG. 8 one or more user systems 812 may interact via a network 14 with a multitenant database system (MTS) 816. The users of those user systems 812 may be users in differing capacities and the capacity of a particular user system 812 might be determined by the current user. For example, when a salesperson is using a particular user system 812 to interact with MTS 816, that user system 812 may have the capacities allotted to that salesperson. However, while an administrator is using the same user system 812 to interact with MTS 816, it has the capacities allotted to that administrator.

Network 814 may be a LAN (local area network), WAN (wide area network), wireless network, point-to-point network, star network, token ring network, hub network, or any other appropriate configuration. The global internetwork of networks, often referred to as the "Internet" with a capital "I," is used in many of the examples herein and is one example of a TCP/IP (Transfer Control Protocol and Internet Protocol) network. It should be understood, however, that the networks that the disclosed embodiments may utilize any of various other types of networks.

User systems 812 may communicate with MTS 816 using TCP/IP and, at a higher network level, use other common Internet protocols to communicate, such as HTTP, FTP, AFS, WAP, etc. As an example, where HTTP is used, user system 812 might include an HTTP client commonly referred to as a "browser" for sending and receiving HTTP messages from an HTTP server at MTS 816. Such a server might be implemented as the sole network interface between MTS 816 and network 814, but other techniques might be used as well or instead. In some implementations, the interface between MTS 816 and network 814 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 8 implements a web-based customer relationship management (CRM) system. For example, in some embodiments, MTS 816 includes application servers configured to implement and execute CRM software applications as well as provide related data, code, forms, web pages and other information to and from user systems 812 and to store to, and retrieve from, a database system related data, objects and web page content. In embodiments of a multitenant system, tenant data is preferably arranged so that data of one tenant is kept separate from that of other tenants so that that one tenant does not have access to another tenant's data, unless such data is expressly shared.

One arrangement for elements of MTS 816 is shown in FIG. 8, including a network interface 820, storage 822 for tenant data, storage 824 for system data accessible to MTS 816 and possibly multiple tenants, program code 826 for implementing various functions of MTS 816, and a process space 828 for executing MTS system processes and tenant-specific processes, such as running applications as part of an application service.

Several elements in the system shown in FIG. 8 may include conventional, well-known elements that need not be explained in detail here. For example, each user system 812 may be a desktop personal computer, workstation, laptop, PDA, cell phone, or any WAP-enabled device or any other computing device capable of interfacing directly or indirectly to the Internet or other network connection. User system 812 may execute an HTTP client, e.g., a browsing program, such as Microsoft's Internet Explorer™ or Edge browsers, Mozilla's Firefox™ browser, Google's Chrome™ browser, Opera Software's Opera browser, or a WAP-enabled browser in the case of a cell phone, PDA or other wireless device, or the like, allowing a user (e.g., subscriber of a CRM system) of user system 812 to access, process, and view information and pages available to it from MTS 816 over network 814. Each user system 812 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 816 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 812 and its components are operator configurable using applications, such as a browser, that include computer code executable on one or more processing elements. Similarly, in some embodiments, MTS 816 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

According to some embodiments, each MTS 816 is configured to provide web pages, forms, applications, data, and/or media content to user systems 812 to support the access by user systems 812 as tenants of MTS 816. As such, in this embodiment, MTS 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for migrating a group of subscribers on a platform from a first execution engine to a second execution engine, the method comprising:

operating, by a server computer system, the platform for generating application packages using a builder application for the group of subscribers;

generating, by the server computer system using the builder application, a first application package for a particular application using a set of source code;

executing, by the server computer system, the first application package on the platform for the group of subscribers, wherein the first application package is executed using the first execution engine; and migrating, by the server computer system, ones of the group of subscribers to the second execution engine, wherein the migrating includes:

generating, by the server computer system using the builder application, a second application package for the particular application, wherein the second application package is generated from the first application package without using the set of source code; and executing, by the server computer system, the second application package on the platform for the migrated ones of the group of subscribers, wherein the second application package is executed using the second execution engine;

while the ones of the group of subscribers are being migrated to the second execution engine:

executing, by the server computer system, the first and second application packages for non-migrated and migrated ones of the group of subscribers, respectively;

generating, by the server computer system, revised versions of the first and second application packages based on edits to a single version of the set of source code; and after the group of subscribers have migrated to the second execution engine, disabling, by the server computer system, application components associated with the first, but not the second, application package;

wherein the first and second application packages are different versions of the particular application; and wherein the first application package is not executable using the second execution engine, and the second application package is not executable using the first execution engine.

2. The method of claim 1, further comprising:
using, by the server computer system, the first execution engine to execute extensible markup language (XML) application packages; and
using, by the server computer system, the second execution engine to execute Apex application packages.

3. The method of claim 1, wherein generating the second application package from the first application package includes:
determining a particular programming language used in the generation of the first application package; and
translating program code written in the determined programming language into a different programming language associated with the second application package.

4. The method of claim 1, wherein generating the second application package from the first application package includes excluding a feature from the second application package that is included in the first application package.

5. The method of claim 1, wherein generating the second application package from the first application package includes modifying an implementation of a feature in the second application package from the implementation in the first application package.

6. The method of claim 1, further comprising:
in response to a modification of the set of source code, regenerating, by the builder application, the first application package using the modified set of source code; and
in response to the regeneration of the first application package, regenerating, by the builder application, the second application package from the regenerated first application package.

7. The method of claim 1, wherein the platform is a cloud-based application development and execution platform that includes a first execution environment that includes the first execution engine and a second execution environment that includes the first execution engine.

8. The method of claim 1, wherein the first and second application packages specify respective sets of application modules, which, when executed, utilize respective sets of application components.

9. The method of claim 8, wherein disabling the application components includes:

in response to upgrading from the first application package to the second application package, generating, by the server computer system, a first set of values indicative of versions of a first set of application modules specified by the first application package;

determining, by the server computer system, a second set of values indicative of versions of a second set of application modules specified by the second application package; and disabling, by the server computer system, the application components associated with application modules specified in the first, but not the second, set of values.

10. A system comprising:
a processor circuit; and
a memory circuit including instructions that when executed by the processor circuit, cause the system to perform operations including:
operating a platform for generating application packages using a builder application for a group of subscribers;
generating, using the builder application, a first application package for a particular application using a set of source code;
executing, using a first execution engine, the first application package on the platform for the group of subscribers; and
migrating ones of the group of subscribers to a second execution engine, wherein the migrating includes:
generating, using the builder application, a second application package for the particular application, wherein the second application package is generated from the first application package without using the set of source code; and
executing, using the second execution engine, the second application package on the platform for the migrated ones of the group of subscribers;
while ones of the group of subscribers are migrated to the second execution engine:
executing the first and second application packages for non-migrated and migrated ones of the group of subscribers, respectively; and
generating revised versions of the first and second application packages based on edits to a single version of the set of source code; and
after the group of subscribers have migrated to the second execution engine, disabling application components associated with the first, but not the second, application package;
wherein the first and second application packages are different versions of the particular application; and
wherein the first application package is not executable using the second execution engine, and the second application package is not executable using the first execution engine.

11. The system of claim 10, wherein the first execution engine is configured to execute extensible markup language (XML) application packages; and
wherein the second execution engine is configured to execute Apex application packages.

12. The system of claim 10, wherein generating the second application package from the first application package includes excluding a feature from the second application package that is included in the first application package.

13. The system of claim 10, wherein generating the second application package from the first application package includes modifying an implementation of a feature in the second application package from the implementation in the first application package.

14. The system of claim 10, wherein generating the revised versions of the first and second application packages includes:

receiving an updated version of the first application package, wherein the updated version of the first application package is generated using a modified version of the set of source code; and in response to receiving the updated version of the first application package, generating an updated version of the second application package from the updated version of the first application package.

15. A non-transitory computer-readable medium having computer instructions stored thereon that are capable of being executed by a server computer system to cause operations comprising:

generating, using a builder application, a first application package using a set of source code accessible to the server computer system, wherein the first application package is for executing, by a group of subscribers, a particular application using a first execution engine;

executing the first execution engine to perform operations of the first application package, for the group of subscribers;

migrating ones of the group of subscribers to a second execution engine, different from the first execution engine, wherein the migrating includes:

generating, using the builder application, a second application package from the first application package without using the set of source code; and executing the second execution engine, to perform operations of the second application package, for the migrated ones of the group of subscribers;

while the ones of the group of subscribers are being migrated to the second execution engine:

executing the first and second application packages for non-migrated and migrated ones of the group of subscribers, respectively; and generating revised versions of the first and second application packages based on edits to a single version of the set of source code; and after the group of subscribers have migrated to the second execution engine, disabling application components associated with the first, but not the second, application package;

wherein the first and second application packages are different versions of the particular application; and wherein the first application package is not executable using the second execution engine, and the second application package is not executable using the first execution engine.

16. The non-transitory computer-readable medium of claim 15, wherein the operations further comprise:

using the first execution engine to execute extensible markup language (XML) application packages; and using the second execution engine to execute Apex application packages.

17. The non-transitory computer-readable medium of claim 15, wherein to generate the second application package from the first application package, the operations further comprise:

determining a particular programming language used in the generation of the first application package; and translating program code written in the determined programming language into a different programming language associated with the second application package.

18. The non-transitory computer-readable medium of claim 15, wherein the operations further comprise:

using the builder application to generate an upgraded version of the first application package using modified source code; and in response to the generation of the upgraded version of the first application package, using the builder application to generate an upgraded version of the second application package from the upgraded version of the first application package.

19. The non-transitory computer-readable medium of claim 15, wherein to generate the second application package from the first application package, the operations further comprise modifying an implementation of a feature in the second application package from the implementation in the first application package.

20. The non-transitory computer-readable medium of claim 15, wherein the first and second application packages specify respective sets of application modules, which, when executed, utilize respective sets of application components.

* * * * *